United States Patent
Salter et al.

(10) Patent No.: US 10,529,229 B2
(45) Date of Patent: Jan. 7, 2020

(54) TRAFFIC SYSTEM LINKED ILLUMINATING VEHICLE ASSEMBLY

(71) Applicant: Ford Global Technologies, LLC, Dearborn, MI (US)

(72) Inventors: Stuart C. Salter, White Lake, MI (US); Paul Kenneth Dellock, Northville, MI (US); Pietro Buttolo, Wayne, MI (US); Annette Lynn Huebner, White Lake, MI (US); James J. Surman, Clinton Township, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 15/662,653

(22) Filed: Jul. 28, 2017

(65) Prior Publication Data
US 2019/0035264 A1    Jan. 31, 2019

(51) Int. Cl.
| | | |
|---|---|---|
| *G08G 1/01* | (2006.01) | |
| *G01S 13/93* | (2006.01) | |
| *G01C 21/26* | (2006.01) | |
| *G08G 1/07* | (2006.01) | |
| *G08G 1/095* | (2006.01) | |

(52) U.S. Cl.
CPC ........... *G08G 1/0104* (2013.01); *G01C 21/26* (2013.01); *G01S 13/931* (2013.01); *G08G 1/07* (2013.01); *G08G 1/095* (2013.01); *G01S 2013/9339* (2013.01)

(58) Field of Classification Search
CPC ........ G08G 1/0104; G08G 1/07; G08G 1/095; G01C 21/26; G01S 13/931; G01S 2013/9339
See application file for complete search history.

(56) References Cited

U.S. PATENT DOCUMENTS

| | | |
|---|---|---|
| 7,095,318 B1 | 8/2006 | Bekhor |
| 7,167,104 B2 | 1/2007 | DiPiazza |
| 7,182,398 B2 | 2/2007 | Lin |
| 7,806,070 B2 | 10/2010 | Williams |
| 9,162,616 B2 | 10/2015 | Wu |
| 9,714,749 B1 * | 7/2017 | Salter ...................... F21S 43/50 |
| 9,824,589 B1 * | 11/2017 | Ramirez .............. G08G 1/0112 |
| 2005/0094409 A1 * | 5/2005 | Elwell .................. B60Q 1/2661 362/496 |
| 2005/0134478 A1 * | 6/2005 | Mese ............... G08G 1/096716 340/901 |

(Continued)

FOREIGN PATENT DOCUMENTS

GB    2531084    4/2016

*Primary Examiner* — Sisay Yacob
(74) *Attorney, Agent, or Firm* — Vichit Chea; Carlson, Gaskey & Olds

(57) ABSTRACT

An exemplary vehicle system includes an illuminating vehicle assembly and a control system configured to communicate with a traffic control device and control the illuminating vehicle assembly to emit lighting effects that are synchronized with the traffic control device. An exemplary method for controlling the illuminating vehicle assembly includes receiving a wireless signal from a traffic control device, and controlling the illuminating vehicle assembly to produce a lighting effect that is synchronized with a corresponding lighting effect of the traffic control device.

21 Claims, 5 Drawing Sheets

(56) References Cited

U.S. PATENT DOCUMENTS

| | | | | |
|---|---|---|---|---|
| 2011/0068951 A1* | 3/2011 | Schwartz | ............... | G08G 1/087 340/906 |
| 2012/0140075 A1* | 6/2012 | Cunningham | ......... | G08G 1/096 348/148 |
| 2013/0093890 A1* | 4/2013 | Cunningham | ......... | B60K 35/00 348/148 |
| 2013/0293104 A1* | 11/2013 | Wu | .................... | B60Q 1/50 315/77 |
| 2014/0104036 A1* | 4/2014 | Skonberg | ............ | G07C 9/00111 340/5.3 |
| 2015/0379872 A1* | 12/2015 | Al-Qaneei | ....... | G08G 1/096783 340/905 |
| 2017/0011628 A1* | 1/2017 | Rios Cortes | ........... | B60Q 1/302 |
| 2017/0259754 A1* | 9/2017 | Gong | ..................... | B29C 69/00 |

\* cited by examiner

TRAFFIC SYSTEM LINKED ILLUMINATING VEHICLE ASSEMBLY

TECHNICAL FIELD

This disclosure relates to illuminating vehicle assemblies for communicating with traffic control systems to better communicate traffic situations to pedestrians.

BACKGROUND

Traffic control systems include a multitude of illuminated traffic lights and signs designed to control traffic on a roadway. These traffic control devices are also designed to keep pedestrians safe when attempting to cross over the roadway. Traditional traffic control devices, such as overhead traffic lights and crosswalk signs, are losing effectiveness due to many pedestrians being distracted on their phones or other personal electronic devices while walking.

SUMMARY

A vehicle system according to an exemplary aspect of the present disclosure includes, among other things, an illuminating vehicle assembly and a control system configured to communicate with a traffic control device and control the illuminating vehicle assembly to emit lighting effects that are synchronized with the traffic control device.

In a further non-limiting embodiment of the foregoing vehicle system, the illuminating vehicle assembly is an illuminated grille assembly.

In a further non-limiting embodiment of either of the foregoing vehicle systems, the illuminating vehicle assembly includes a plurality of grille bars each having at least one light source.

In a further non-limiting embodiment of any of the foregoing vehicle systems, each of the plurality of grille bars includes a housing, the at least one light source, and at least one optic device.

In a further non-limiting embodiment of any of the foregoing vehicle systems, the housing includes a metallic film secured to a plastic part and a plastic backing secured to the plastic part.

In a further non-limiting embodiment of any of the foregoing vehicle systems, a printed circuit board (PCB) is housed within the housing.

In a further non-limiting embodiment of any of the foregoing vehicle systems, the at least one light source is a light emitting diode (LED).

In a further non-limiting embodiment of any of the foregoing vehicle systems, the LED is a multi-colored LED.

In a further non-limiting embodiment of any of the foregoing vehicle systems, the control system is configured to turn a first portion of the light sources ON and turn a second portion of the light sources OFF to create the lighting effects within the illuminating vehicle assembly.

In a further non-limiting embodiment of any of the foregoing vehicle systems, the vehicle system includes a global positioning system (GPS) in communication with the control system.

In a further non-limiting embodiment of any of the foregoing vehicle systems, the vehicle system includes a communication system including a first wireless device configured to receive wireless signals from a second wireless device of the traffic control device.

In a further non-limiting embodiment of any of the foregoing vehicle systems, the first wireless device and the second wireless device are Bluetooth Low Energy (BLE) transceivers.

In a further non-limiting embodiment of any of the foregoing vehicle systems, the wireless signals include information specific to a current traffic situation.

In a further non-limiting embodiment of any of the foregoing vehicle systems, the information includes a total time of a current cycle of the traffic control device and an amount of time left in the current cycle.

In a further non-limiting embodiment of any of the foregoing vehicle systems, the information includes a directional indication of the traffic control device and a location of the traffic control device.

A method according to an exemplary aspect of the present disclosure includes, among other things, receiving a wireless signal from a traffic control device, and controlling the illuminating vehicle assembly to produce a lighting effect that is synchronized with a corresponding lighting effect of the traffic control device.

In a further non-limiting embodiment of the foregoing method, the lighting effect of the illuminating vehicle assembly mimics the corresponding lighting effect of the traffic control device.

In a further non-limiting embodiment of either of the foregoing methods, controlling the illuminating vehicle assembly includes sequentially illuminating grille bars of the illuminating vehicle assembly to produce a visual countdown that is synchronized with a current cycle of the traffic control device.

In a further non-limiting embodiment of any of the foregoing methods, controlling the illuminating vehicle assembly includes simultaneously producing both a countdown traffic indicator and a turn indicator within the illuminating vehicle assembly.

In a further non-limiting embodiment of any of the foregoing methods, determining whether the traffic control device is relevant to a traveling path of the vehicle prior to controlling the illuminating vehicle assembly.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

The various features and advantages of this disclosure will become apparent to those skilled in the art from the following detailed description. The drawings that accompany the detailed description can be briefly described as follows.

DETAILED DESCRIPTION

This disclosure details vehicle systems for communicating traffic situations to pedestrians. An exemplary vehicle system includes an illuminating vehicle assembly that may be selectively controlled to emit various lighting effects that are synchronized with a corresponding lighting effect of a traffic control device. These and other features of this disclosure are described in greater detail below.

Figure 1:
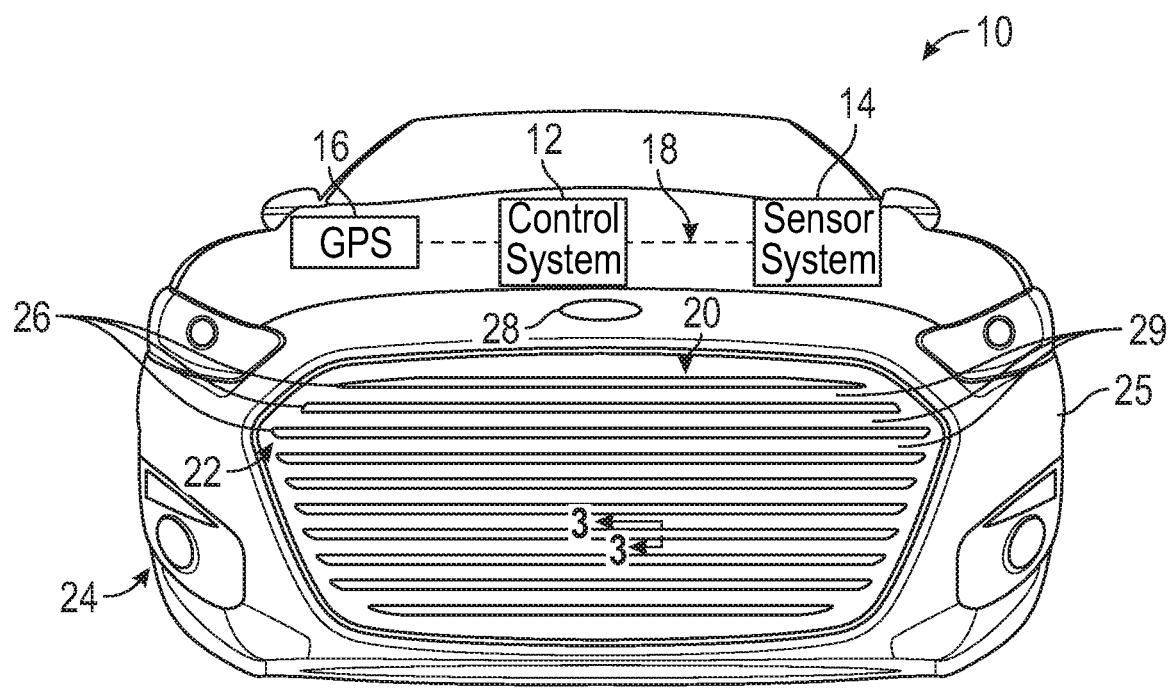
FIG. 1 illustrates a vehicle equipped with an illuminating vehicle assembly.

FIG. 1 schematically illustrates a vehicle 10. The vehicle 10 may be a car, a truck, a van, a sport utility vehicle, or any other type of vehicle. The vehicle 10 could also be a conventional motor vehicle, a battery powered hybrid or electric vehicle, or an autonomous vehicle (i.e., a driverless vehicle).

Although a specific component relationship is illustrated in the figures of this disclosure, the illustrations are not intended to limit this disclosure. In other words, the placement and orientation of the various components of the vehicle 10 are shown schematically and could vary within the scope of this disclosure. In addition, the various figures accompanying this disclosure are not necessarily to scale, and some features may be exaggerated or minimized to show certain details of a particular component.

In an embodiment, the vehicle 10 is an autonomous vehicle (i.e., driverless vehicle) capable of sensing its environment and navigating between locations with little to no human input. In autonomous vehicle embodiments, the vehicle 10 may include a control system 12, a sensor system 14, and a global positioning system (GPS) 16 that are capable of communicating with one another for controlling operation of the vehicle 10 with little to no human input. The vehicle 10 may include various other systems and components for achieving driverless functionality. In an embodiment, the control system 12, the sensor system 14, the GPS 16, and various other systems (e.g., steering, braking, accelerating, etc.) communicate with one another over a controlled area network (CAN) 18.

The sensor system 14 may communicate with the control system 12 for providing information about the environment within which the vehicle 10 is operating. The sensor system 14 may include various cameras, radar, and lasers that provide raw information about the surrounding environment. This information can be analyzed and processed by the control system 12 for controlling the autonomous vehicle 10, such as along a desired route. The GPS 16 may also communicate with the control system 12 for providing information such as vehicle position, speed, and directionality. A map database is stored within the GPS 16 or can be remotely accessed by the GPS 16 (e.g., over a wireless data connection) for route planning and monitoring.

The vehicle 10 may also include an illuminating vehicle assembly 20. The illuminating vehicle assembly 20 may be part of a vehicle lighting system of the vehicle 10. In an embodiment, the illuminating vehicle assembly 20 is configured as an illuminated grille assembly which generally covers an opening 22 in a front portion 24 of the vehicle 10. However, other illuminating vehicle assemblies are also contemplated within the scope of this disclosure. In addition, although an illuminating vehicle assembly for the front portion 24 of the vehicle 10 is described herein, illuminating vehicle assemblies positioned at other vehicle locations could be similarly configured.

The illuminating vehicle assembly 20 may be mounted to a portion of a vehicle body 25. In an embodiment, the illuminating vehicle assembly 20 is mounted to a front end assembly of the vehicle body 25. Other mounting locations are also contemplated within the scope of this disclosure.

The illuminating vehicle assembly 20 may include a plurality of grille bars 26. Although depicted as having ten grille bars 26, the total number of grille bars 26 of the illuminating vehicle assembly 20 is not intended to limit this disclosure. Thus, the illuminating vehicle assembly 20 could include a greater or fewer number of grille bars 26 within the scope of this disclosure.

The plurality of grille bars 26 may be arranged in a spaced relationship relative to one another. This spaced relationship establishes a gap 29 between adjacent grille bars 26. Air may enter the engine compartment of the vehicle 10 through the gaps 29 for cooling various parts, such as the engine and the radiator, for example.

Figure 2:
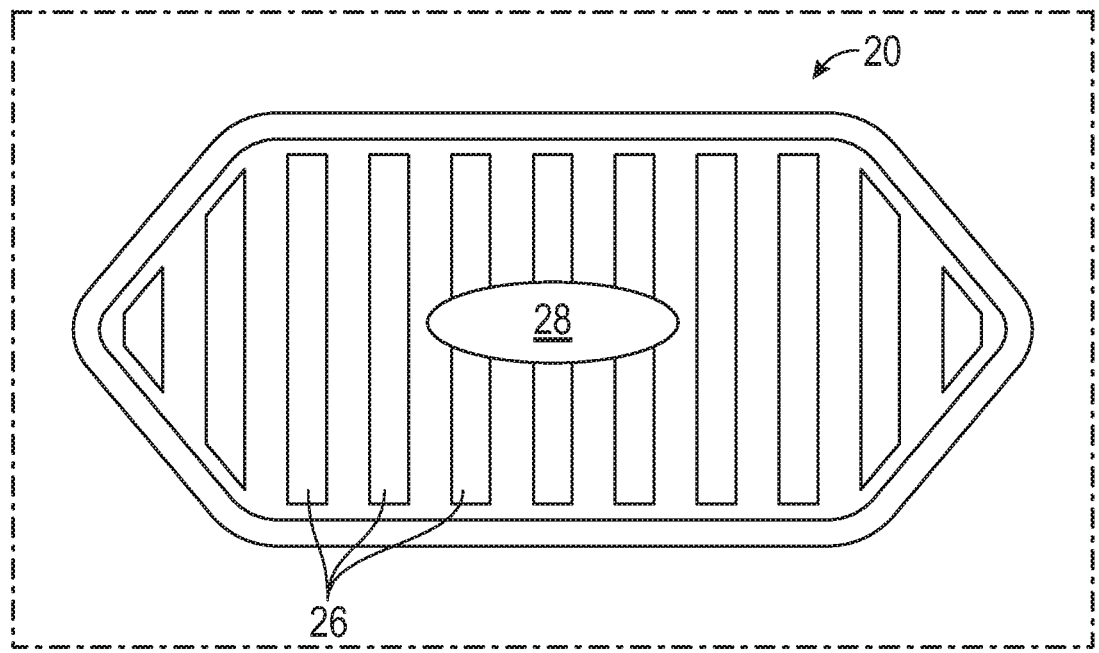
FIG. 2 illustrates another exemplary illuminating vehicle assembly.

The grille bars 26 may be arranged to extend horizontally (see, e.g., FIG. 1) or vertically (see, e.g., FIG. 2) relative to the front portion 24 of the vehicle 10. In another embodiment, the grille bars 26 are arranged in a crosshatched configuration. The grille bars 26 could also embody either linear or non-linear configurations within the scope of this disclosure.

The vehicle 10 may additionally include a badge 28 for identifying the make and/or model of the vehicle 10. In an embodiment, the badge 28 is mounted remotely from the illuminating vehicle assembly 20 (see, e.g., FIG. 1). In another embodiment, the badge 28 is mounted to or is an integral component of the illuminating vehicle assembly 20 (see, e.g., FIG. 2). Separate from their various other utilities, the illuminating vehicle assembly 20 and the badge 28 may function as styling elements for enhancing the appearance of the vehicle 10.

The illuminating vehicle assembly 20 can be selectively controlled to create a combination of lighting effects (e.g., in terms of color, brightness, number of grille bars illuminated, flashing, pulsing, etc.) that provide visual feedback of various operating behaviors of the vehicle 10 to both pedestrians and operators of other vehicles. In addition, as will be discussed below in greater detail, each grille bar 26 of the illuminating vehicle assembly 20 can be configured to emit light to create a combination of lighting effects for communicating traffic information to pedestrians and/or other vehicle operators that are near the vehicle 10. In an embodiment, since it is mounted at the front portion 24 of the vehicle 10, the illuminating vehicle assembly 20 provides visual feedback of traffic situations to the front of the vehicle 10

In an embodiment, the illuminating vehicle assembly 20 is controlled by the control system 12. The control system 12 may include one more control modules equipped with executable instructions for interfacing with and commanding operation of various components of the vehicle 10, including but not limited to the illuminating vehicle assembly 20. Each such control module may include a processing unit and non-transitory memory for executing the various control strategies and modes of the vehicle 10. The processing unit, in an embodiment, is configured to execute one or more programs stored in the memory of the control system 12. A first exemplary program, when executed, may determine when and how to illuminate (or, optionally, not to illuminate) the grille bars 26 of the illuminating vehicle assembly 20. The control system 12 may control various other functions associated with the illuminating vehicle assembly 20 of the vehicle 10.

Figure 3:
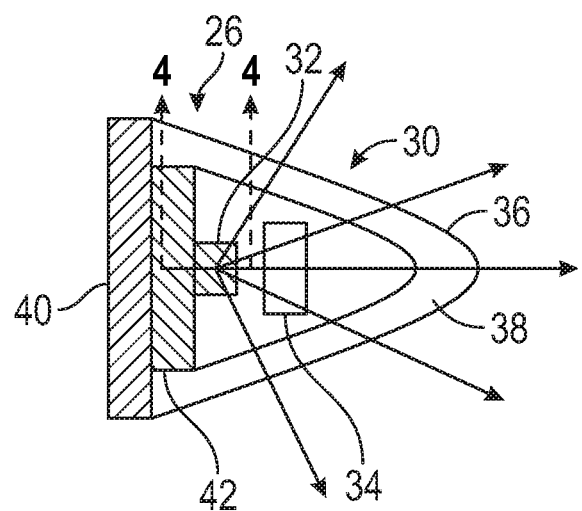
FIG. 3 is a sectional view through a grille bar of the illuminating vehicle assembly of FIG. 1.

FIG. 3 is a cross-sectional view of one of the grille bars 26 of the illuminating vehicle assembly 20. The various other grille bars 26 of the illuminating vehicle assembly 20 could be configured in a similar manner.

In an embodiment, each grille bar 26 of the illuminating vehicle assembly 20 includes a housing 30, one or more light sources 32, and one or more optic devices 34. Although not specifically shown or described, the illuminating vehicle assembly 20 could include additional components such as reflectors, bezels, thermal transfer devices, sealing devices, etc.

The housing 30 may be manufactured in a variety of ways. In an embodiment, the housing 30 includes a metallic film 36, a plastic section 38, and a plastic backing 40. The plastic section 38 may be insert molded on or otherwise secured to the back of the metallic film 36. In an alternative embodiment, the metallic film 36 can be applied to the plastic section 38 via partial vacuum deposition or a direct metallization process.

The plastic backing 40 may be assembled together with the plastic section 38 and the metallic film 36 to establish the housing 30. The plastic backing 40 may be low pressure over molded, low-pressure insert molded, potted, etc.

The metallic film 36 gives the housing 30 a metallic (i.e., chrome-like) appearance. In an embodiment, the metallic film 36 is an aluminum film; however, other metallic films could also be utilized. The metallic film 36 may be light permeable to allow light from the light sources 32 to escape from the inside to the outside of the housing 30. The metallic film 36 may therefore behave similarly to a two-way mirror.

The plastic section 38 may be constructed from a rigid material that is also light permeable. In an embodiment, the plastic section 38 is constructed from an acrylic material, such as acrylic plastic, for example. However, other plastic materials are also contemplated within the scope of this disclosure. The light that is ultimately emitted through the plastic section 38 and the metallic film 36 of the housing 30 provides visual feedback of various operating behaviors of the vehicle 10 to pedestrians and/or operators of other vehicles.

The housing 30 houses each light source 32 and each optic device 34 of each grille bar 26. The optic device(s) 34 focuses the light emitted by the light source(s) 32, such as in a narrow pattern that can be emitted with a desired directionality through the housing 30. In an embodiment, the optic device 34 is positioned in front of the light source 32 (i.e., between the light source 32 and the plastic section 38). In another embodiment, in addition to its various other functions, the plastic section 38 may function as an optic device.

Each light source 32 may be a light emitting diode (LED). In an embodiment, the light source 32 is a multi-colored LED, such as a Red, Green, and Blue (RGB) LED, for example. Other light sources could also be utilized within the scope of this disclosure. The light sources 32 may be powered by a vehicle power supply system, for example.

Figure 4:
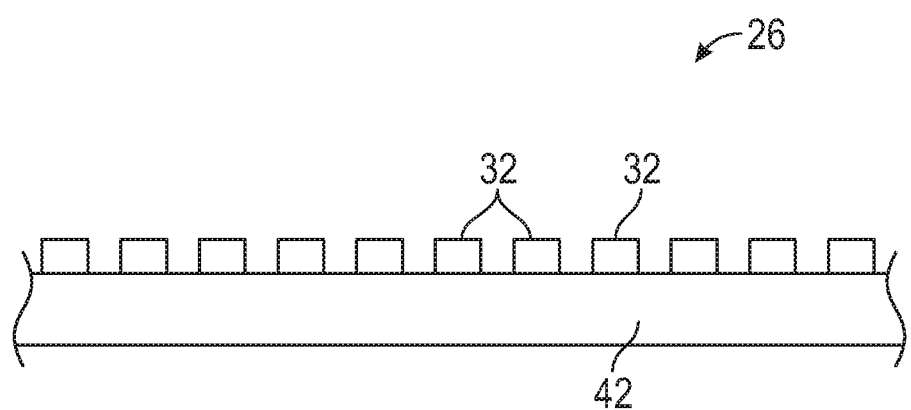
FIG. 4 is a sectional view through a portion of the grille bar of FIG. 3.

The illuminating vehicle assembly 20 may include a plurality of the light sources 32 arranged in a spaced relationship along a printed circuit board (PCB) 42 (see, e.g., FIG. 4). The PCB 42 may extend longitudinally inside the housing 30 and could extend across the entire length of the grille bar 26. The PCB 42 may be mounted to the plastic backing 40. The total number of light sources 32 may vary and is vehicle dependent. In an embodiment, the illuminating vehicle assembly 20 includes a sufficient number of light sources 32 for visualizing the combination of lighting effects emitted therefrom during both daytime conditions and nighttime conditions. Each light source 32 of each grille bar 26 of the illuminating vehicle assembly 20 can be selectively controlled either individually or as a unit, such as via the control system 12, to generate various lighting effects that can be emitted by the illuminating vehicle assembly 20 for communicating the traffic situation to pedestrians.

Figure 5:
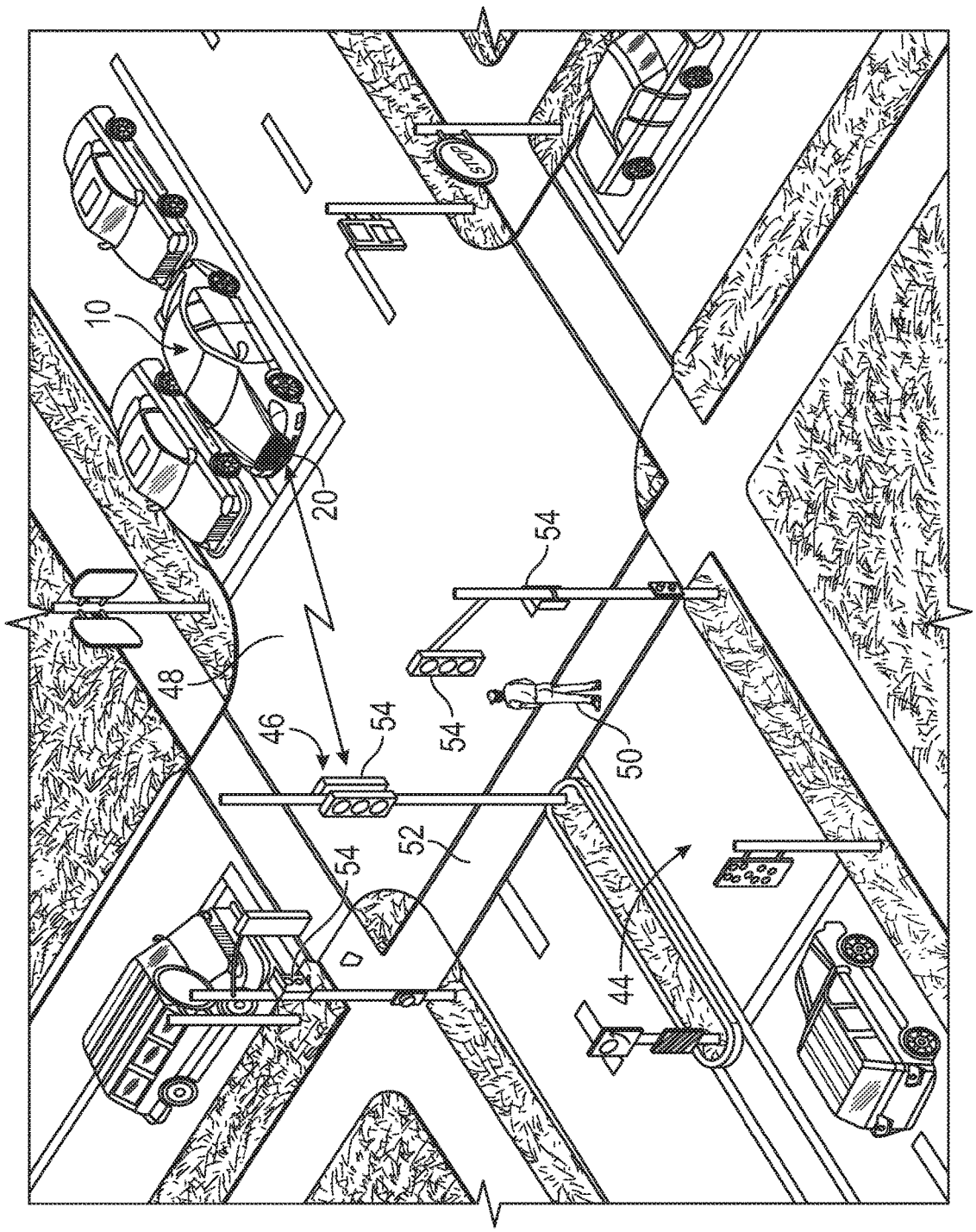
FIG. 5 schematically illustrates the vehicle of FIG. 1 operating on a roadway that includes a traffic control system.

FIG. 5 schematically illustrates the vehicle 10 travelling along a roadway 44 that includes a traffic control system 46. The traffic control system 46 is entirely separate from the vehicle 10 and may include one or more traffic control devices 54. The traffic control devices 54 may include overhead traffic lights, crosswalk lights, or both. The traffic control system 46 controls the flow of traffic through an intersection 48 of the roadway 44. The traffic control system 46 may also control the crossing of pedestrians 50 over crosswalks 52 at the intersection 48 of the roadway 44.

In an embodiment, the illuminating vehicle assembly 20 of the vehicle 10 communicates (e.g., is capable of receiving and/or sending signals) with one or more of the traffic control devices 54 of the traffic control system 46 and then emits lighting effects for communicating traffic situations to the pedestrians 50. Exemplary lighting effects that can be produced by the illuminating vehicle assembly 20 are discussed in greater detail below with reference to FIGS. 7-9.

Figure 6:
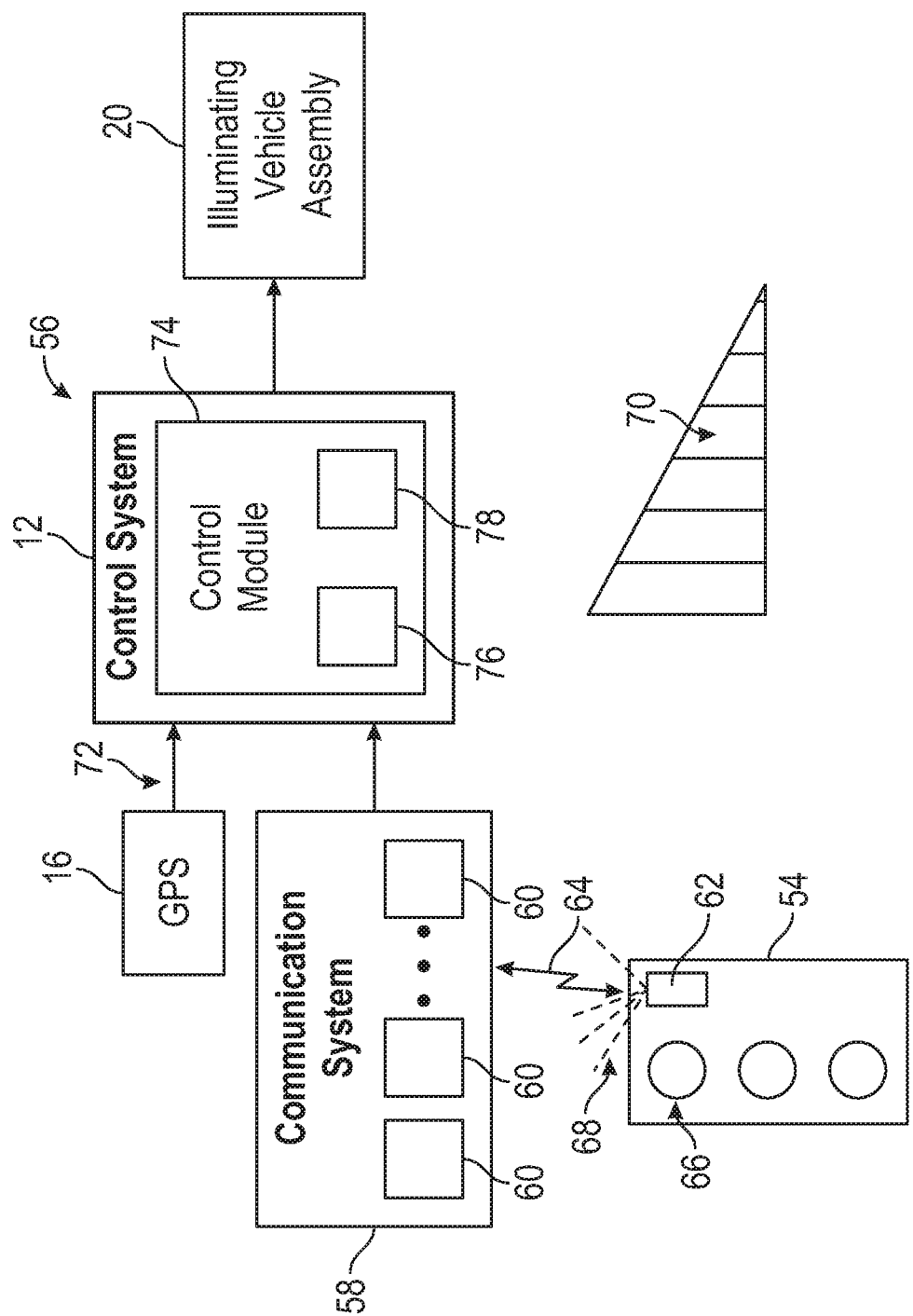
FIG. 6 illustrates a block diagram of a vehicle system having an illuminating vehicle assembly configured to communicate with a traffic control device to better communicate traffic situations to pedestrians.

FIG. 6, with continued reference to FIGS. 1-5, schematically illustrates an exemplary vehicle system 56 of the vehicle 10. The vehicle system 56 may be employed to visually indicate traffic situations to pedestrians 50 who are attempting to cross over one of the crosswalks 52 of the roadway 44. The vehicle system 56 is designed to provide the pedestrians 50 with a more complete picture of the traffic situation than that provided by the traffic control system 46 alone. For example, some pedestrians 50 may become distracted by checking their phones or other personal electronic devices and therefore may not always see the traffic control devices 54 of the traffic control system 46 when attempting to cross the crosswalk 52. The illuminating vehicle assembly 20 of the vehicle system 56 is generally closer to the eye level of the distracted pedestrians 50 as compared to the traffic control devices 54. Accordingly, emitting lighting effects on the illuminating vehicle assembly 20 that are synchronized with the current cycle of the traffic control devices 54 makes it more likely that the pedestrians 50 who are distracted on their personal electronic devices will be made aware of the current traffic situations.

In an embodiment, the vehicle system 56 includes the illuminating vehicle assembly 20, a communication system 58, the control system 12, and the GPS 16. As detailed above, the illuminating vehicle assembly 20, which could be an illuminated grille assembly of the vehicle 10, includes one or more light sources 32 that emit light to produce various lighting effects. During certain situations, lighting effects may be created to better communicate the traffic situation to the pedestrians 50 who are nearby the vehicle 10.

The communication system 58 is configured to communicate with one or more of the traffic control devices 54 of the traffic control system 46. The communication system 58 may include one or more wireless devices 60 that facilitate the detection of, and the proximity of, nearby traffic control devices 54. The wireless devices 60 may be imbedded or otherwise mounted at various locations of the vehicle 10, such as at a roof rack, molding, front and rear bumpers, doors, in-vehicle components, etc. In an embodiment, the wireless devices 60 are Bluetooth Low Energy (BLE) transceivers configured to receive and/or emit low energy Bluetooth signals as a way to determine the proximity of each traffic control device 54 relative to the vehicle 10.

As shown schematically, each traffic control device 54 (only one shown in FIG. 6) may also include a wireless device 62 (e.g., another BLE transceiver) configured to communicate with the wireless device(s) 60 of the communication system 58 over a wireless connection 64. The wireless connection 64 may be a BLE connection, a Wi-Fi connection, or any other type of wireless connection. Each traffic control device 54 may additionally include one or more signaling devices 66 (e.g., lights, etc.) that are capable of emitting lighting effects for indicating various traffic situations to drivers and pedestrians. Exemplary lighting effects that may be displayed by the signaling devices 66 of the traffic control device 54 include but are not limited to displaying various colors to indicate commands such as stop (e.g., emit red light), go (e.g, emit green light) or caution (e.g., emit yellow light), or displaying a numbered countdown to indicate to the pedestrians 50 how much time they have to cross the crosswalk 52.

The wireless device 62 of the traffic control device 54 may periodically (e.g., about every half-second or any other time interval) broadcast wireless signals 68 that include information pertinent to the current traffic situation. In an embodiment, the wireless signals 68 include a multitude of information specific to the current traffic situation, including but not limited to, total time of the current cycle (i.e., green cycle, red cycle, caution cycle, etc.), amount of time left in the current cycle, directional indication of the traffic control device 54, and/or GPS location of the traffic control device 54.

The wireless signals 68 may be received by the wireless devices 60 of the communication system 58. Based on the wireless signals 68, the communication system 58 can determine the approximate distance and direction of each traffic control device 54 relative to the vehicle 10. For example, in an exemplary embodiment, the approximate distance of each traffic control device 54 from the vehicle 10 can be obtained by measuring a signal strength 70 over the wireless connection 64 between the wireless device(s) 62 of the traffic control device 54 and the wireless device(s) 60 of the communication system 58. This may include the use of various location tracking techniques, including but not limited to proximity, triangulation, and lateration methods. During certain situations, the communication system 58 may send signals to the control system 12 representative of the locations of each nearby traffic control devices 54.

The communication system 58 and the GPS 16 of the vehicle 10 are both in electrical communication with the control system 12. In an embodiment, the communication system 58 and the GPS 16 communicate with the control system 12 over a CAN 72. Based on the information received from the communication system 58 and the GPS 16, the control system 12 can determine the direction and location of each traffic control device 54 and the current traffic situation being indicated by the signaling devices 66 of each traffic control device 54. The GPS information embedded in the wireless signals 68, in combination with the information received from the GPS 16, allows the control system 12 to differentiate between multiple nearby traffic control devices 54 and thus determine which traffic control device 54 is most relevant to the current traveling path of the vehicle 10. In most situations, the traffic control device 54 most relevant to the vehicle 10 is the traffic control device 54 currently controlling the ability of the vehicle 10 to pass through the intersection 48 of the roadway 44. In another embodiment, such as if the wireless signals 68 do not include GPS location information, the control system 12 may utilize a tracking technique (e.g., triangulation) to determine the most relevant traffic control device 54.

The control system 12 may include one or more control modules 74 equipped with executable instructions for interfacing with a commanding operation of various components of the vehicle 10, including but not limited to the illuminating vehicle assembly 20 and the communication system 58. In an embodiment, one of the control modules 74 is a body control module (BCM) of the vehicle 10. Other control modules of the vehicle 10 may also be part of the control system 12. Each control module 74 may include a processing unit 76 and non-transitory memory 78 for executing the various control strategies or modes of the vehicle 10.

Figure 7:
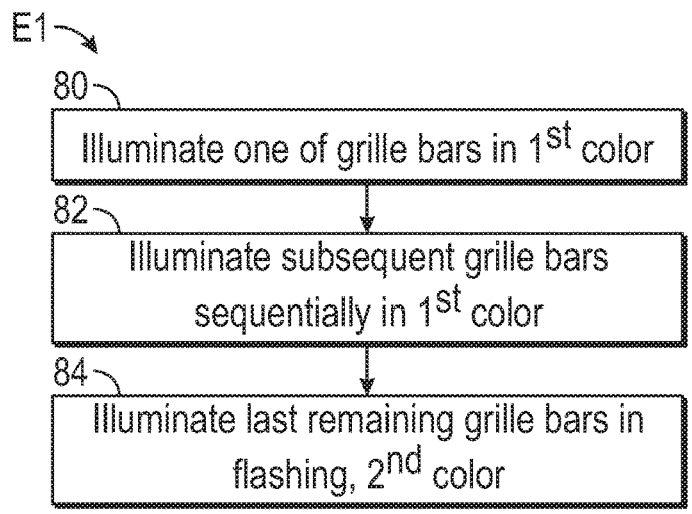
FIG. 7 schematically illustrates a first lighting effect that can be indicated by a traffic system linked illuminating vehicle assembly.
Figure 8:
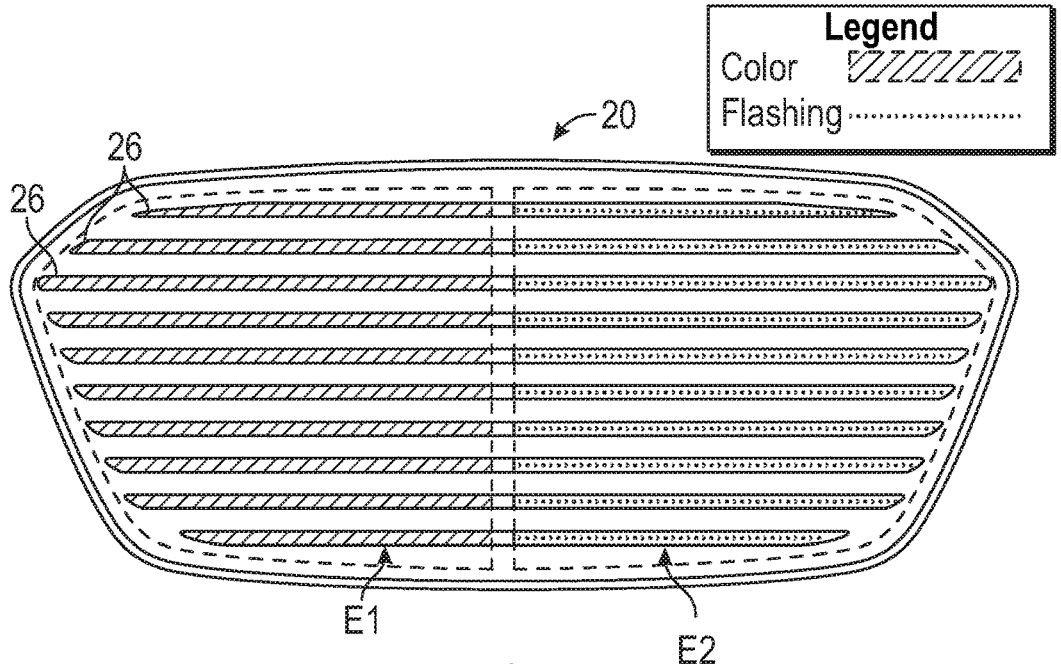
FIG. 8 schematically illustrates a second lighting effect that can be indicated by a traffic system linked illuminating vehicle assembly.
Figure 9:
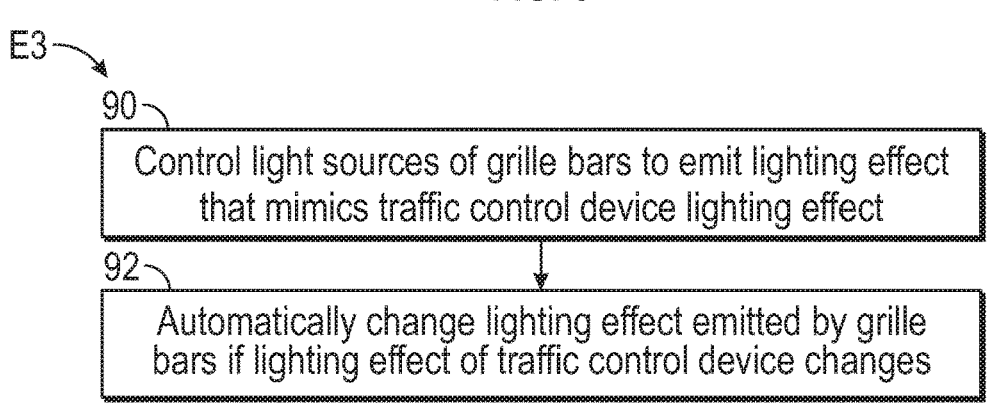
FIG. 9 schematically illustrates a third lighting effect that can be indicated by a traffic system linked illuminating vehicle assembly.

The processing unit 76, in an embodiment, is configured to execute one or more programs stored in the memory 78 of the control module 74. A first exemplary program, when executed, may determine when and how to illuminate (or, optionally, not to illuminate) the grille bars 26 of the illuminating vehicle assembly 20. In an embodiment, the control system 12 may control the illuminating vehicle assembly 20 to emit lighting effects that are synchronized with corresponding lighting effects of the traffic control device 54 that is currently controlling movement of the vehicle 10 relative to the intersection 48. The current lighting effects being emitted by the traffic control device 54 are indicated to the control system 12 by virtue of the wireless signals 68 that are received from the traffic control device 54. FIGS. 7-9 (with continued reference to FIGS. 1-6) schematically illustrate various examples of such synchronized operating behaviors of the illuminating vehicle assembly 20. It should be understood that the illustrated operating behaviors are intended as non-limiting examples of the types of visual cues that can be created by the illuminating vehicle assembly 20. Where appropriate, a legend is included in these figures to aid the understanding of each exemplary operating behavior.

A second exemplary program that may be executed by the control system 12 may occur when the vehicle 10 arrives at the intersection 48 and has not received any wireless signals 68 from the traffic control devices 54. In such as situation, the control system 12 assumes that a malfunction/power loss event has occurred. The control system 12 may then command the communication system 58 to communicate with other vehicles located at the intersection 48 to negotiate the order in which the vehicles will cross the intersection 48. In addition, the control system 12 may command the illuminating vehicle assembly 20 to emit lighting effects to instruct nearby pedestrians when it is safe for them to cross the crosswalk 52.

FIG. 7 schematically illustrates a first exemplary lighting effect E1 that can be generated by the illuminating vehicle assembly 20. For example, the first lighting effect E1 can be emitted from the illuminating vehicle assembly 20 to provide the visual effect of a countdown for alerting pedestrians of the amount of time left in a current cycle of the traffic control device 54.

If the first lighting effect E1 has been commanded by the control system 12, a first of the grille bars 26 of the illuminating vehicle assembly 20 may be illuminated in a first color (e.g., amber), which is shown schematically at block 80. Subsequent grille bars 26 of the illuminating vehicle assembly 20 are then illuminated, in sequential order, in the first color (see block 82). Next, at block 84, the last few remaining grille bars 26 can be sequentially illuminated in a second, flashing color (e.g., red) to indicate that the cycle of the traffic control device 54 is about to end and change to a new cycle. The flashing lights of these last few grille bars 26 are intended to better capture the attention of the nearby pedestrians. Alternatively, rather than illuminating the grille bars 26, the grille bars 26 can be de-illuminated during blocks 80 to 84 to visually indicate the countdown. If a pedestrian is still in front of the vehicle 10 after block 84 and the current cycle of the traffic control device 54 is about to end, the communication system 58 of the vehicle 10 may communicate wireless signals 68 to the traffic control device 54 to request that it delay the impending cycle change.

In an embodiment, the grille bars 26 can be illuminated sequentially from the bottom up or from the top down. Alternatively, such as for a vertical grille bar arrangement, the grille bars 26 could be illuminated sequentially from left to right or from right to left. Sequentially illuminating the grille bars 26 in this manner provides the visual effect of a countdown for alerting pedestrians and other drivers of impending vehicle movement.

In another embodiment, the total number of grille bars 26 of the illuminating vehicle assembly 20 can be equated with the total amount of time of the current cycle of the traffic control device 54. For example, if the current cycle of the traffic control device 54 is set to run for 30 seconds and the illuminating vehicle assembly 20 includes ten grille bars 26, then each grille bar 26 can be illuminated for approximately 3 seconds. It should be understood that the grille bars 26 can be commanded to emit lighting effects for any amount of time within the scope of this disclosure.

FIG. 8 schematically illustrates a second exemplary lighting effect E2 that can be generated by the illuminating vehicle assembly 20. The second lighting effect E2 can be emitted from the illuminating vehicle assembly 20 concurrently with the first lighting effect E1 such that the illuminating vehicle assembly 20 acts as both a countdown traffic indicator and a turn indicator of the vehicle 10. If the second lighting effect E2 has been commanded by the control system 12, portions of the grille bars 26 located on the side in which the vehicle 10 is turning may emit colored flashing lights in a common color (e.g., amber). The other sides of the grille bars 26 can be illuminated to simultaneously produce the first lighting effect E1 with the same or different colors.

In an embodiment, each light source 32 of the grille bars 26 can be individually controlled by the control system 12 to achieve the simultaneous emission of both the first and second lighting effects E1, E2. In another embodiment, each grille bar 26 is segmented into sections (e.g, left, center, right) which can be illuminated separately with different colors and patterns for increased flexibility in communicating the traffic situations to pedestrians.

FIG. 9 schematically illustrates a third exemplary lighting effect E3 that can be generated by the illuminating vehicle assembly 20. The third lighting effect E3 can be emitted from the illuminating vehicle assembly 20 to mimic the current lighting effect being emitted by the traffic control device 54. Stated another way, the illuminating vehicle assembly 20 may be synchronized with the traffic control device 54 such that these devices can emit lighting effects that substantially mimic one another to better communicate the traffic situation to pedestrians.

For example, if the third lighting effect E3 has been commanded by the control system 12, each light source 32 of each grille bar 26 can be controlled to emit a lighting effect that matches the current lighting effect being emitted by the traffic control device 54 (see block 90). The lighting effect emitted by each grille bar 26 of the illuminating vehicle assembly 20 is automatically changed at block 92 if the lighting effect of the traffic control device 54 changes. The lighting effect of the traffic control device 54 may change in response to a cycle change, for example.

The traffic linked illuminating vehicle assemblies described herein can better communicate traffic situations to pedestrians even during situations in which the pedestrians are distracted. The illuminating vehicle assemblies can be synchronized to count down with a traffic control device by producing various lighting effects.

Although the different non-limiting embodiments are illustrated as having specific components or steps, the embodiments of this disclosure are not limited to those particular combinations. It is possible to use some of the components or features from any of the non-limiting embodiments in combination with features or components from any of the other non-limiting embodiments.

It should be understood that like reference numerals identify corresponding or similar elements throughout the several drawings. It should be understood that although a particular component arrangement is disclosed and illustrated in these exemplary embodiments, other arrangements could also benefit from the teachings of this disclosure.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. A vehicle system, comprising:
   an illuminating vehicle assembly including a plurality of grille bars each having at least one light source;
   a control system configured to communicate with a traffic control device and control the illuminating vehicle assembly to emit lighting effects that are synchronized with the traffic control device,
   wherein the lighting effects include a visual countdown that mimics an amount of time remaining in a current cycle of the traffic control device; and
   a global positioning system (GPS) in communication with the control system.

2. A vehicle system, comprising:
   an illuminating vehicle assembly; and
   a control system configured to communicate with a traffic control device and control the illuminating vehicle assembly to emit lighting effects that are synchronized with the traffic control device,
   wherein the lighting effects include a visual countdown that mimics an amount of time remaining in a current cycle of the traffic control device,
   wherein the illuminating vehicle assembly is an illuminated grille assembly.

3. The vehicle system as recited in claim 1, wherein each of the plurality of grille bars includes a housing, the at least one light source, and at least one optic device.

4. The vehicle system as recited in claim 3, wherein the housing includes a metallic film secured to a plastic part and a plastic backing secured to the plastic part.

5. The vehicle system as recited in claim 3, comprising a printed circuit board (PCB) housed within the housing.

6. The vehicle system as recited in claim 1, wherein the at least one light source is a light emitting diode (LED).

7. The vehicle system as recited in claim 6, wherein the LED is a multi-colored LED.

8. The vehicle system as recited in claim 1, wherein the control system is configured to turn a first portion of the light sources ON and turn a second portion of the light sources OFF to create the lighting effects within the illuminating vehicle assembly.

9. A vehicle system, comprising:
an illuminating vehicle assembly located at an exterior of a vehicle;
a control system configured to communicate with a traffic control device and control the illuminating vehicle assembly to emit lighting effects that are synchronized with the traffic control device,
wherein the lighting effects include a visual countdown that mimics an amount of time remaining in a current cycle of the traffic control device; and
a communication system including a first wireless device configured to receive wireless signals from a second wireless device of the traffic control device.

10. The vehicle system as recited in claim 9, wherein the first wireless device and the second wireless device are Bluetooth Low Energy (BLE) transceivers.

11. The vehicle system as recited in claim 9, wherein the wireless signals include information specific to a current traffic situation.

12. The vehicle system as recited in claim 11, wherein the information includes a total time of a current cycle of the traffic control device and an amount of time left in the current cycle.

13. The vehicle system as recited in claim 11, wherein the information includes a directional indication of the traffic control device and a location of the traffic control device.

14. A method for a vehicle equipped with a vehicle illuminating assembly, comprising:
receiving a wireless signal from a traffic control device; and
controlling the illuminating vehicle assembly to produce a lighting effect that is synchronized with a corresponding lighting effect of the traffic control device,
wherein the lighting effect produced by the illuminating vehicle assembly visually indicates a current traffic condition to a pedestrian located external to the vehicle.

15. The method as recited in claim 14, wherein the lighting effect of the illuminating vehicle assembly mimics the corresponding lighting effect of the traffic control device.

16. The method as recited in claim 14, wherein controlling the illuminating vehicle assembly includes:
sequentially illuminating grille bars of the illuminating vehicle assembly to produce a visual countdown that is synchronized with a current cycle of the traffic control device.

17. The method as recited in claim 14, wherein controlling the illuminating vehicle assembly includes:
simultaneously producing both a countdown traffic indicator and a turn indicator within the illuminating vehicle assembly.

18. The method as recited in claim 14, comprising:
determining whether the traffic control device is relevant to a traveling path of the vehicle prior to controlling the illuminating vehicle assembly.

19. The method as recited in claim 14, wherein controlling the illuminating vehicle assembly includes:
sequentially de-illuminating grille bars of the illuminating vehicle assembly to produce a visual countdown that is synchronized with a current cycle of the traffic control device.

20. The method as recited in claim 14, wherein the lighting effect is produced near an eye level of the pedestrian.

21. A vehicle, comprising:
an illuminating grille assembly mounted to a front of the vehicle; and
a control system configured to determine a location of a traffic control device that is most relevant to a current traveling path of the vehicle;
wherein the control system is further configured to control the illuminating grille assembly to emit lighting effects that are synchronized with the traffic control device,
wherein the lighting effects include a visual countdown created by sequentially illuminating or de-illuminating grille bars of the illuminating grille assembly for alerting a pedestrian external to the vehicle of an amount of time remaining in a current cycle of the traffic control device.

* * * * *